UNITED STATES PATENT OFFICE.

GUSTAV SPITZ, OF BRÜNN, AUSTRIA-HUNGARY, ASSIGNOR TO GOLDSCHMIDT DETINNING COMPANY, OF NEW YORK, N. Y., A CORPORATION OF NEW JERSEY.

PROCESS OF PURIFYING ALKALI STANNATES.

1,041,895.     Specification of Letters Patent.     Patented Oct. 22, 1912.

No Drawing.     Application filed November 6, 1909. Serial No. 526,604.

*To all whom it may concern:*

Be it known that I, GUSTAV SPITZ, subject of the Emperor of Austria-Hungary, and resident of Brünn, in the Empire of Austria-Hungary, have invented a new and useful Process of Purifying Alkali Stannates, of which the following is an exact description.

My invention consists in a process for cleaning solutions of alkali, which have been used for the purpose of separating metals from metal coated waste and which contain such an amount of impurities that they are no longer able to separate the metal.

During the process for separating metals, which are soluble in alkalis, from metal waste, alloys, etc., by treating the latter under pressure with a hot alkaline solution containing an excess of free alkali and oxidizing means, there will be obtained at the end of the operation a lye which still contains a small percentage of free alkali. This lye has been made use of by adding a fresh alkaline solution so that the solution was again fit to act upon metallic material. I have described such a process in my co-pending application #526603, filed Nov. 6, 1909. Now, I have found that the dissolving action of the solution is considerably reduced by the various impurities with which it is contaminated during the course of the operation. Thus, for instance, during the process of detinning tinplate scrap, the solution is contaminated with silica, alumina and lead. These contaminations not only reduce the dissolving action of the solution but they will, of course, also contaminate the product to be obtained, in this case, the oxid of tin. In order to avoid these drawbacks, I proceed in the following manner, choosing as an example the treatment of tin-bearing material. Into the solution obtained at the end of the above-mentioned process, tin-bearing material, as for instance tin scrap, is placed, without adding a fresh amount of alkaline solution. The solution is heated preferably in a closed vessel to over 100° C. If a sufficient amount of oxidizing reagent (as for instance saltpeter) is present in the solution and if the solution contains say $2\frac{1}{2}$ per cent. of free alkali or less, there will be produced only oxid of tin which is not dissolved by the small amount of free alkali present in the solution. This oxid of tin, at the moment of its being produced, carries with itself the greatest part of the impurities, as for instance silica, alumina and lead, which are thus precipitated in an insoluble condition.

The solution of stannate of sodium freed from this precipitate is considerably cleaner than that obtained by treating the tin-bearing materials with concentrated lye, and therefore it is possible to obtain from this solution a much purer oxid of tin than was posible to obtain heretofore.

What I claim is:

1. Process of purifying an impure alkaline solution of alkali stannate containing impurities such as silica, alumina and lead, which process consists in treating the solution with material containing metallic tin in the presence of an oxidizing salt.

2. Process of purifying an impure alkaline solution of alkali stannate containing impurities such as silica, alumina and lead, which process consists in treating the solution with material containing metallic tin in the presence of sodium nitrate.

3. Process of purifying an impure alkaline solution of alkali stannate containing impurities such as silica, alumina and lead, which process consists in adding to the solution tin scrap in the presence of an oxidizing salt.

4. Process of purifying an impure alkaline solution of alkali stannate containing impurities such as silica, alumina and lead, which process consists in adding to the solution tin scrap in the presence of sodium nitrate.

In testimony whereof I have hereunto set my hand in presence of two subscribing witnesses.

GUSTAV SPITZ.

Witnesses:
   AUGUST FUGGER,
   ALEXANDER WEINGARTNER.

---

Copies of this patent may be obtained for five cents each, by addressing the "Commissioner of Patents, Washington, D. C."